United States Patent [19]

Inagaki

[11] Patent Number: 4,859,345

[45] Date of Patent: Aug. 22, 1989

[54] BATH WATER HEATER AND CIRCULATOR-PURIFIER APPARATUS

[76] Inventor: Jitsuo Inagaki, 71, Aza Kamiyashiki, Oaza Itsusiki, Itsusikicho, Hazugun, Aichi, Japan

[21] Appl. No.: 236,734

[22] Filed: Aug. 26, 1988

[51] Int. Cl.$^4$ .......................... B01D 17/00; C02F 1/68
[52] U.S. Cl. ..................... 210/764; 210/742; 210/177; 210/169; 210/206; 210/766; 422/43; 424/76.9; 128/369
[58] Field of Search ............... 210/742, 175, 177, 766, 210/169, 764, 206; 4/542; 128/369; 422/43; 252/380, 385; 424/76.9

[56] References Cited

U.S. PATENT DOCUMENTS

| | | | |
|---|---|---|---|
| 430,725 | 6/1890 | Baker | 424/76.9 |
| 3,509,254 | 4/1970 | Krotinger et al. | 424/76.9 |
| 3,518,047 | 6/1970 | Alsgaard | 422/43 |
| 3,531,239 | 9/1970 | Rowlette | 422/43 |
| 3,749,244 | 7/1973 | Jannuzzi, Jr. | 210/169 |
| 3,786,921 | 1/1974 | Johnson | 210/169 |
| 3,943,580 | 3/1976 | Carter | 210/169 |
| 4,023,528 | 5/1977 | Applegate | 210/169 |
| 4,083,067 | 4/1978 | Lieb et al. | 210/169 |
| 4,213,210 | 7/1980 | Scourtes | 128/369 |
| 4,233,694 | 11/1980 | Janosko et al. | 210/169 |
| 4,240,906 | 12/1980 | Edmondson | 210/169 |
| 4,349,434 | 9/1982 | Jaworski | 210/169 |
| 4,552,658 | 11/1985 | Adcock et al. | 210/169 |
| 4,657,670 | 4/1987 | Newton | 210/169 |
| 4,761,838 | 8/1988 | Hargrove | 4/542 |
| 4,776,963 | 10/1988 | Inagaki et al. | 210/764 |
| 4,780,216 | 10/1988 | Wojtowicz | 210/169 |
| 4,780,917 | 11/1988 | Hancock | 4/542 |

*Primary Examiner*—Peter Hruskoci
*Assistant Examiner*—Cynthia L. Nessle
*Attorney, Agent, or Firm*—Donald W. Hanson

[57] ABSTRACT

A bath water heater and circulator-purifier apparatus that removes microorganisms and other organic substances found in bath water and maintains the temperature of water at a given level without changing water.

An apparatus according to the present invention comprises a removable filter for filtering bath water pumped up from a bath tub, a heater for heating the pumped up water, a temperature sensor for controlling the heater, an ejector for ejecting the filter and heated water into the bath tub with air bubbles having a cleansing and skin-stimulating effect and a container for adding to the bath water a water purifying agent having an effect of separating and agglomerating organic substances as well as an effect of sterilizing and deodorizing bath water and suppressing generation of steam.

4 Claims, 3 Drawing Sheets

BATH WATER HEATER AND CIRCULATOR-PURIFIER APPARATUS

BACKGROUND OF THE INVENTION

This invention relates to a bath water heater and circulator-purifier apparatus that eliminates the necessity of changing bath water for bathing and allows cleansing of bathers' bodies without washing.

In civilized countries, consumption of household tap water is ever increasing, causing a serious problem of water shortage in every urban area as construction of dams for securing water supply is not an easy task. While the water consumed for bathing can take a large portion of the total water consumption in a household since used bath water has to be wholly replaced with fresh water, measures for saving bath water have not been seriously discussed mainly because of sanitary considerations. For instance, simply filtering used bath water for reuse can not satisfactorily remove microorganisms and other organic substances that are found in the water.

On the other hand, the advantages of reuse of bath water are numerous, particularly when the bath water has a cleaning effect and the temperature of the bath water is maintained at a given level. Firstly, little time is required for heating the water to a desired temperature and one can take a bath whenever he or she wants.

Secondly, for elderly people who are plentiful in number in a society where longevity prevails, particularly for those who are forced to stay in bed for physical reasons, a bath containing bath water that has a cleansing effect and does not require any use of soap for washing can be a real benefit.

BRIEF SUMMARY OF THE INVENTION

It is therefore an object of the present invention to provide a bath water heater and circulator-purifier apparatus that removes microorganisms and other organic substances found in the bath water and maintains the temperature of the water at a given level.

It is another object of the present invention to provide a bath water heater and circulator-purifier apparatus that is compact in dimensions, inexpensive and can be easily installed on a wall of a living room or can be used with an existing bath tub.

It is still another object of the present invention to provide a bath water heater and circulator-purifier apparatus that can supply a sufficient amount of hot water to accomodate the need of a large family which tends to consume a large amount of hot water in a bath within a short period of time.

It is still another object of the present invention to provide a bath water heater and circulator-purifier apparatus that can retain additives such as flowers of sulphur in water when such additives are used.

Other objects as well as advantages of the present invention will become apparent in a more detailed description of the invention below which is made by referring to the accompanying drawings.

BRIEF DESCRIPTION OF DRAWINGS

In the accompanying drawings.

DETAILED DESCRIPTION OF THE INVENTION

A bath water heater and circulator-purifier apparatus according to the present invention which is devised to achieve the above objects as well as other objects is characterized by that it comprises a removable filter means for filtering bath water pumped up from a bath tub, a heating means for heating the pumped up water, a temperature sensing means for controlling said heating means and a means for ejecting the filtered and heated water into the bath tub with air bubbles having a cleansing and skin-stimulating effect, a certain amount of a water purifying agent having an effect of separating and agglomerating organic substances as well as an effect of sterilizing and deodorizing bath water and suppressing generation of steam being added to the bath water and the apparatus being able to be installed near the bath tub.

A bath water heater and circulator-purifier apparatus according to the present invention can, when used in combination with a cleansing mineral agent having an effect of sterilizing, separating and agglomerating microorganisms, not only can purify bath water but also can completely suppress the proliferation of microorganisms normally found in bath water, although the temperature of the bath water is held at a level favorable for reproduction of microorganisms, and generation of water vapor and accompanying odor as a result of addition of a mineral agent, so that the apparatus can be installed in a living room. Moreover, ultrasonic waves generated by the apparatus exert not only not only have a cleansing effect to the body of a bather but also, in synergism with a mineral additive, but also have an effect of promoting contact between the body and the bath water and therefore blood circulation as well as an effect of warming up the body and keeping the body warm to such an extent that surpasses the effect of a natural hot spring.

Now an embodiment of the present invention will be described by referring to the accompanying drawings.

Figure 1:
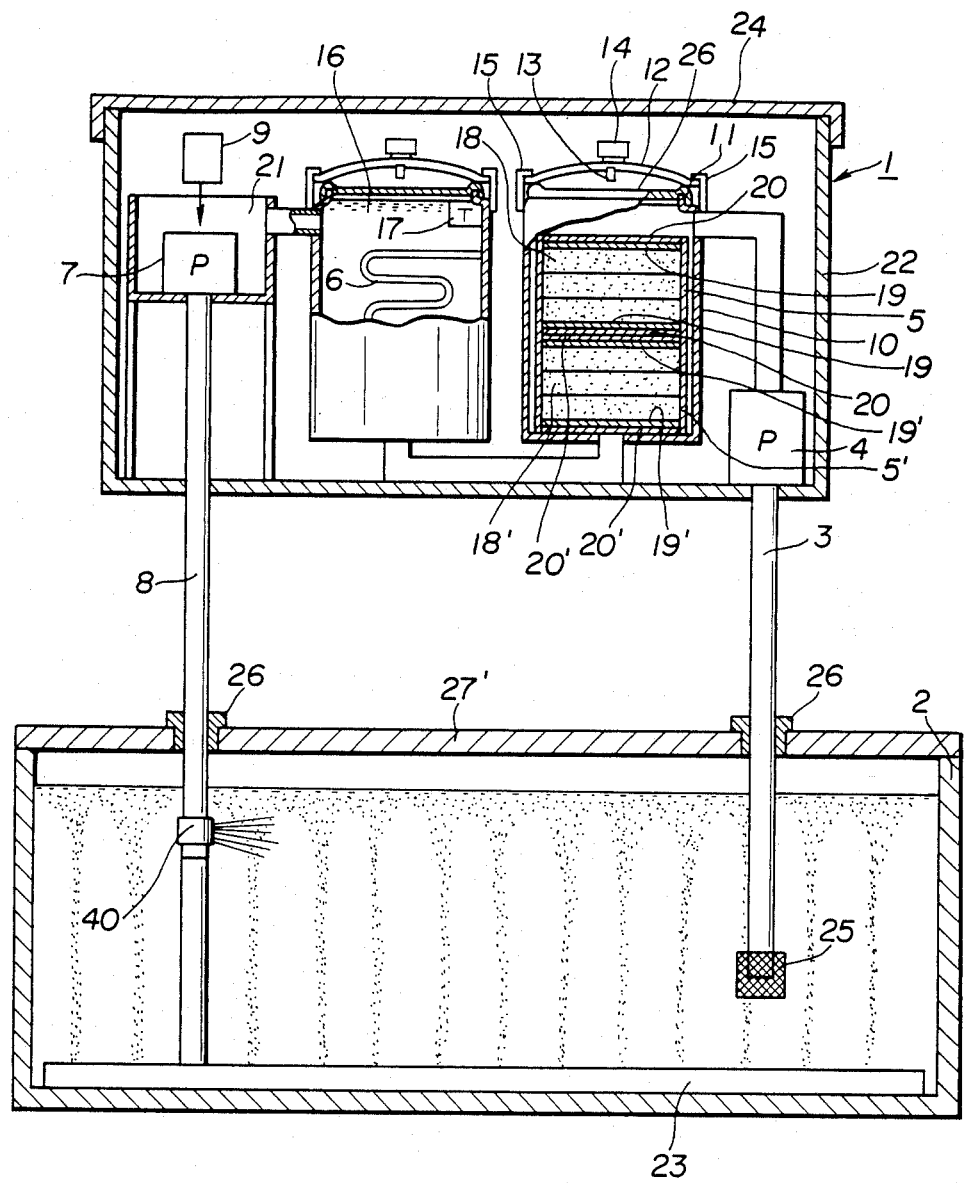
FIG. 1 is a schematic partial sectional view of an embodiment of the bath water heater and circulator-purifier apparatus according to the present invention.

FIG. 1 illustrates a schematic partial sectional view of an embodiment of the bath water heater and circulator-purifier apparatus according to the present invention.

Figure 2:
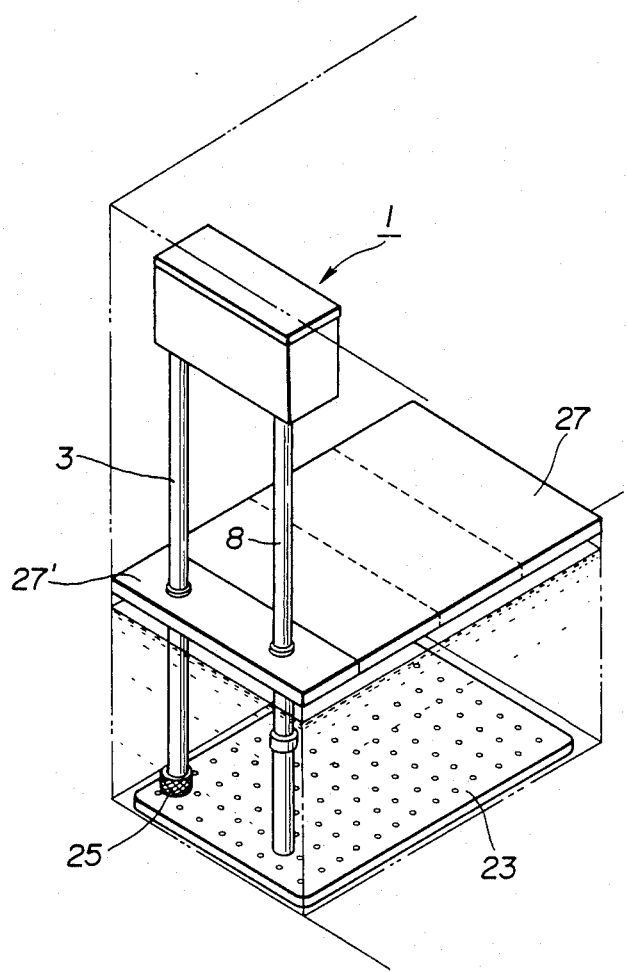
FIG. 2 is a perspective view of the embodiment of FIG. 1, showing an air jet panel fitted to an ejector pipe.

FIG. 2 illustrates a perspective view of the embodiment of FIG. 1, showing an air jet panel fitted to an ejector pipe.

Heater and circulator-purifier apparatus 1 according to the present invention comprises a pump 4 for pumping up bath water from bath tub 2 by way of suction pipe 3, a filter cylinder 5,5' removably installed for filtering the pumped up bath water, a heater 6 for heating the filtered bath water in a heating chamber 16, an ejector pipe nozzle 8 for ejecting the bath water with air bubbles into the bath tub by means of air pump 7 and an injector 9 for injecting a mineral agent for purifying the bath water at a given rate. Some of the components are contained in a rectangular parallelepiped case 22 provided with a lid 24 on the top side.

Pumps 4 and 7 may be replaced by a pair of impellers based on the known principle of a turbo-charger, where a first impeller is used for pumping up bath water and the pumped up water is fed to a second impeller which in its turn transfers the water by pressurizing it.

Filter cylinder 5,5' is removably fitted in a filter container 10, wherein filter cylinder half 5 forms a primary filter and filter cylinder half 5' forms a secondary filter section. A lid assembly for filter container 10 comprises lid 26 sealingly fitted on the circular edge of the open top side of filter container 10 with a packing 11 interposed therebetween. Lid 26 is provided with a threaded rod standing at the center thereof, on which a thumb nuts 14 is engagedly fitted with an arched strap member 12 placed thereunder.

The lid assembly is so designed that, when thumb nut 14 is tightened, the both ends of strap member 12 firmly abut the respective support metal members 14 fitted on filter container 10 to resiliently depress lid 26. Alternatively, lid 26 can be sealingly fitted on filter container 10 by using an ordinary sealing method of employing a packing member and tightening bolts as commonly practiced for sealing high pressure containers.

Filter cylinder halves 5,5' are respectively charged with suitable filler layers 18,18' inserted respectively between metal net pairs 20,20 and 20',20' with filter cloth pairs 19,19 and 19',19' respectively interposed therebetween. In the above embodiment, filter cylinder 5,5' in the form a cartridge of a plastic material containing a certain amount of a filler agent therein as an integral part thereof and can be repeatedly used by washing the filler agent with water when it is contaminated.

Examples of filler agents that can be used with a filter cylinder according to the present invention include granulated rock, granulated active charcoal, silica, alumina, zeolite, acid clay, bentonite, kaolin and smoked and carbonized chaff, which can be used singly or in combination of any of them.

Cylindrical heating chamber 16 is provided with a thermostat 17 (thermoswitch) or a temperature sensor of any other type in order to control the temperature of the water in the chamber through on and off actions of the switch connected with the heater 6. The top side of heating chamber 16 is sealingly closed with a lid in a similar manner as in the case of filter container 10.

A cylindrical air bubble generator chamber 21 contains an air pump 7 and is provided at the top thereof with an injector 9 or a type that can be used for a high pressure chamber. This injector 9 is designed to inject a solution of a mineral agent for cleansing bath water.

Bath water cleansing type mineral agents that can be used with an apparatus according to the present invention are typically acid additives containing as the principal ingredient a variety of metal and non metal salts that can be prepared by dissolving vermiculite weathered from mica minerals, in aqueous inorganic acid solution (e.g., hydrochloric acid). When additives of this type are used for a bath, organic materials dissolved in bath water are separated and removed and consequently the water is sterilized, while supply of mineral substances are ensured and at the same time all the unsoluble substances contained in the water are agglomerated and removed.

Air bubble generator chamber 21 is provided with an air pump 7. Bath water is pressurized by said air pump 7 and the air that has been taken in by the pump is dissolved in the water under pressure, which then falls down in ejector pipe 8 and releases air bubbles in the bath tub 2.

Ejector pipe 8 is provided with an air jet rate control device of a known type that can adjust the air jet rate of the pipe simply by turning the front end 40 thereof.

As is shown in FIG. 2, the end of ejector pipe 8 may be connected with an attachment such as a rectangular air jet panel 23 located on the bottom of the bath tub. With such an arrangement, a vary large number of air bubbles can be ejected upward from the bottom at one time so that a bather can have his or her body cleansed by simply placing him- or herself on said air jet panel 23, an advantage particularly valuable when the bather is an aged person. Alternately, the attachment can be a pipe which is attached horizontally to a side wall of the bath tub and provided with a number of nozzles for releasing air bubbles therefrom. As another alternative, it can be a pipe which is foldable and/or extendable in such manner that the position and the direction of the air jet nozzles of the pipe can be freely selected. Such an arrangement affords a bather to have air bubbles strike any section of his or her body as he or she likes.

The bottom opening of suction pipe 3 is provided with a cylindrically shaped net 25 for removing relatively large foreign objects that may be found in the bath water.

While any specific limitations are not imposed on the configuration of an apparatus according to the present invention, filter container 10, heating chamber 16 and air bubble generator chamber 21 should be resistant to high pressure since they are subjected to considerable high pressure while in use.

An apparatus according to the present invention as well as a bath tub and a lid to be used with the apparatus are preferably made of heat insulating materials in order to minimize loss of energy. When they are made of heat insulating materials, the bath water can be maintained at a high temperature throughout the day without any significant additional fuel costs as compared with the situation where the bath water is heated each time necessity arises.

In the above described embodiment, suction pipe 3 and ejector pipe 8 run through lid 27' of the bath tub and fitted thereto by means of packings 26.

Bath tub lids 27 and 27' are separable and lid 27 may be made of three parts to form a foldable lid as shown in FIG. 2.

Figure 3:
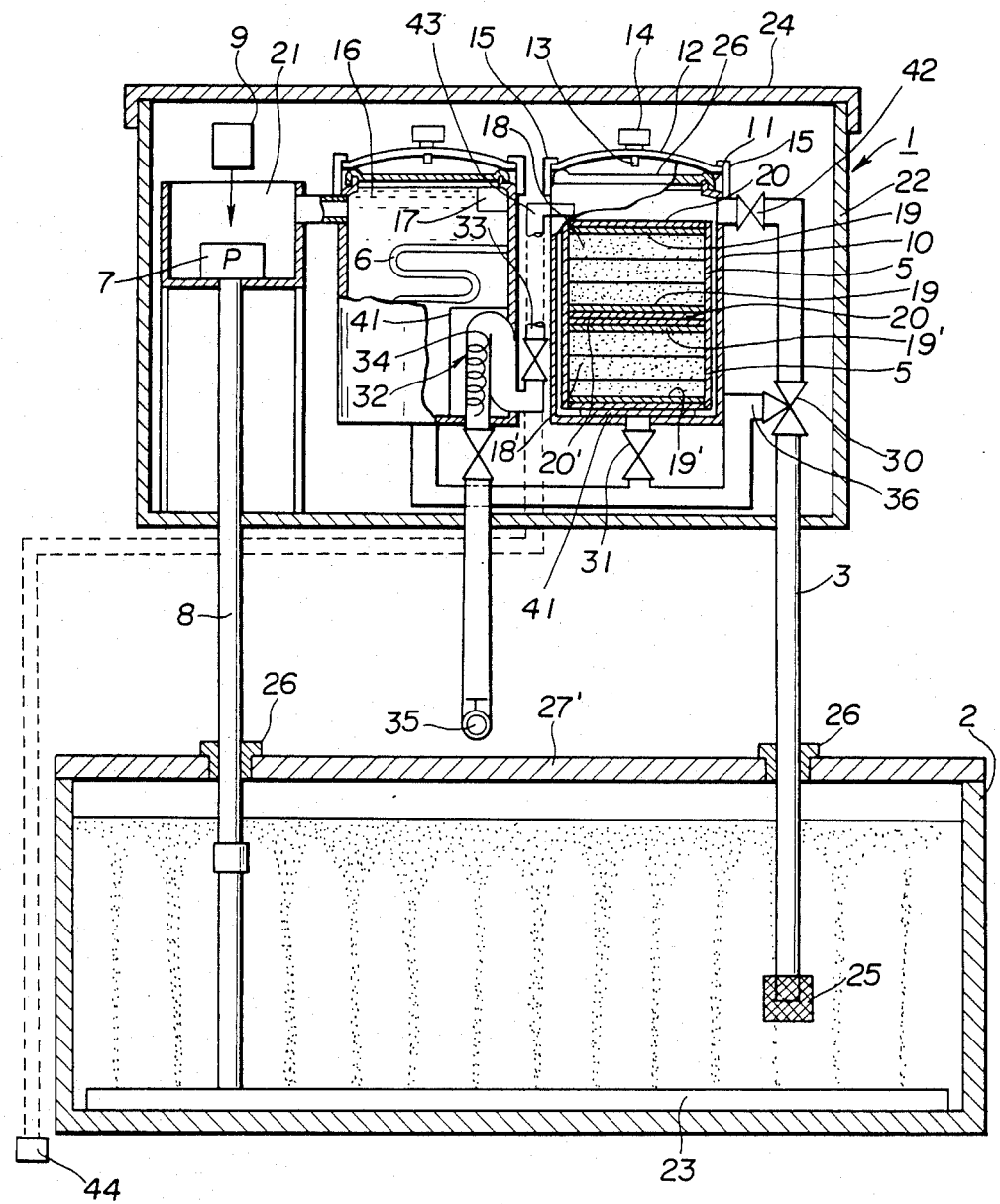
FIG. 3 is a schematic sectional view of another embodiment of the present invention.

FIG. 3 illustrates another embodiment of the present invention which comprises a pump 7 for pumping up bath water from bath tub 2 by way of suction pipe 3, a filter cylinder 5,5' removably installed for filtering the pumped up bath water, a heater 6 for heating the filtered bath water in a heating chamber 16, an ejector pipe 8 for ejecting the bath water with air bubbles that has been heated and pressurized by pump 7 into the bath tub, an injector 9 for injecting a mineral agent for purifying the bath water at a given rate and a cock 30 for selectively feeding the pumped up water either to said filter means or to said heating means. Some of these components being contained in a rectangular parallelepiped case 22 provided with a lid 24 on the top side. In FIG. 3, the reference numeral 31 denotes a cock which is set open when bath water passes the filter means and set closed when bath water is directly fed to the heating means for in order to prevent bath water from flowing backward in the filter means when it is directly transported into the heating means by way of bypass pipe 36.

When such a bypass pipe is provided, bath water can be fed to the heating means by way of the filter means or, alternatively, directly to the heating means until the bath water has been contaminated to such a degree that it requires removal of any additives that may have been contained therein.

With a view to optimize the effect of the above described second embodiment of the heater and circulator-purifier apparatus according to the present invention, an instanteneous water heater assembly 32 may be provided in this embodiment. Said instantenous water heater assembly 32 comprises a water inlet port 33 for receiving water from a tap, a pipe for feeding water into the heater, a helical heating coil 34 located within said pipe and a hot water outlet port 35 for feeding heated water into bath tub 2. Water inlet port 33 and hot water outlet port 35 are respectively provided with a water cock and a hot water cock, which are operable in a concerted manner by means of a relay mechanism. Heating coil 34 in this embodiment is made of a sheathed heating wire. Instantaneous water heater assembly 32 in this embodiment is accomodated in a partition 41 formed within heating chamber 16.

Installation of an instanteneous water heater in this embodiment allows heating of newly supplied fresh water simultaneously with heating of water circulating in the bath-purifier apparatus assembly so that, even when a portion of the water in the bath tub is lost due to effluence during use, it can be immediately replaced by fresh hot water.

Now, the overall function of the embodiment as shown in FIGS. 1 and 2 will be described. Pump 4 starts working by turning on the main switch (not shown). The bath water in the bath tub is drawn through suction pipe 3 into filter container 10 by pump 4 and filtered as it passes through filter cylinder 10. Relatively large foreign objects that may be found in the bath water are removed by net 25 provided at the bottom of the suction pipe 3. The filtered water is then introduced into heating chamber 16 and heated by heater 6. The heating process performed by heater 6 is continued until the temperature of the water in the heating chamber 16 reaches a predetermined maximum level. Like any other control devices of this type, thermostat 17 becomes open to stop supply of electricity to heater 6 when the water is heated to the maximum temperature and the heater restarts its function when the temperature of the water falls below a predetermined minimum level. The heated bath water is then introduced into air bubble generator chamber 21 and several cubic centimeters of a mineral agent for cleansing water is added to the water by means of injector 9 located above this chamber. Addition of minerals causes separation and agglomeration of organic substances that have been dissolved in the water and accordingly the water is sterilized. While the amount of minerals to be added for cleansing bath water depends on the degree of contamination of the water or the number of bathers per day, addition of several cubic centimeters every three days will be sufficient for a family of ordinary size. The bath water is then pressurized by pump 7 and flows down in ejector pipe 8, taking in air coming from an air intake pipe (not shown) in the form of bubbles. At the final stage of circulation, the water is ejected with air bubbles into the bath tub.

As apparent from the above description, the bath water in a bath tub equipped with an apparatus according to the present invention can be used repeatedly for bathing, provided that concentration of cleansing minerals to be contained in the bath water is appropriately adjusted depending on the degree of contamination of the bath water. When the amount of contaminants that have been separated and agglomerated has become large enough to obstruct a smooth circulation of bath water, the filter cylinder should be taken out of the filter container and washed for reuse. For removal of the filter cylinder out of the filter container, the switch is turned off to reduce the inner pressure of the container to the level of atmosphere and thumb nut 14 is turned counterclockwise to disengage strap member 12 and support member 14 so that lid 26 can be freed.

In the above embodiment, the filter cylinder consists of two vertically connected filter cylinder halves 5,5', one being laid on the other, with a view of detaching upper filter cylinder half 5 for washing, since most contaminants in the water are removed by upper filter cylinder half 5, which therefore frequently requires washing, while lower filter cylinder half 5' may require washing only once in a while.

Next, the overall function of the embodiment as shown in FIG. 3 will be described.

Cock 30 and filter container 10 are set to an interlocked relationship and then cock 31 is opened. When the main switch (not shown) is turned on, pump 7 starts working to put heater 6 in operation. The bath water in the bath tub is drawn up through suction pipe 3 into filter container 10 by pump 7 and filtered as it passes through filter cylinder 10. The filtered water is then introduced into heating chamber 16 and heated by heater 6. The heated bath water is then introduced into air bubble generator chamber 21 and several cubic centimeters of a mineral agent for cleansing water are added to the water by means of injector 9 located above this chamber. The bath water is then pressurized by pump 7 and flows down ejector pipe 8 taking in air coming from an air intake pipe (not shown) in the form of bubbles. At the final stage of circulation, the water is ejected with air bubbles into the bath tub 2.

When bath additives such as flowers of sulphur are used, the bath water is preferably allowed to bypass filter container 10 until it is sufficiently contaminated and filtration becomes necessary. For the bath water to bypass filter container 10, cock 30 should be set to communicate with bypass pipe 36, while cock 31 is kept closed.

When a portion of the water in the bath tub is lost due to effluence during use and the amount of water becomes insufficient, a fresh water cock is opened through a relay mechanism by turning a hot water cock, heater 34 being simultaneously turned on to supply hot water from hot water outlet port 35.

With the embodiment as shown in FIG. 3, when water circulation through the apparatus has become deteriorated, the filter cylinder can be washed either by backflow of water through the cylinder or by removing the filter out of position and washing it in an open environment. For washing the bath water by using the backflow technique, ultrasonic wave generator 41 is activated to generate ultrasonic waves under a condition where cocks 31 and 42 are closed and cock 31 is kept open. Insoluble contaminants sedimented on the filter cylinder are set loose through action of the ultrasonic waves and then discharged into drain ditch 44 by way of drain pipe 43.

As described above, since a mineral agent having an effect of cleansing bath water which is used with a heater and circulator-purifier apparatus according to the present invention can not only remove contaminants from the bath water but also prevent survival and reproduction or microorganisms, the bath water can be used throughout a day without need of any additional supply of fresh water. This gives rise to a significant reduction in fuel cost, leading to a social benefit of saving of resources in terms of not only water but also fuel consumption. Moreover, ultrasonic waves generated when air bubbles burst out in the bath water of a bath tub provided with an apparatus according to the present invention have an effect of removing dirt from the pores of the skin of a bather which normally do not come off with soap as well as of, in synergism with a mineral additive whose amount can be set to a most effective level, promoting contact between the body and the bath water and therefore keeping the body warm to such an extent that surpasses the effect of a natural hot spring. Some of other advantages of the present invention are that the generation of water vapor can be held at a relatively low level as an effect of the mineral additives and that it eliminates use of a boiler and therefore a bath tub provided with an apparatus according to the present invention can be installed in a living room, a fact which is very favorable for a family having an aged person who is confined to bed.

Since the second embodiment of the present invention as described above selectively allows bath water either to pass through the filter cylinder or to bypass it, the effect of the ingredients can be maintained until the bath water is significantly contaminated. Moreover, an instantenous water heater is incorporated in the second embodiment of the present invention, allowing circulation and heating of the bath water in the bath tub and allowing heating of fresh water simultaneously so that any loss of the existing bath water through effluence can be immediately compensated.

What is claimed is:

1. A bath water heater and circulator-purifier apparatus comprising a removable filter means for filtering bath water pumped up from a bath tub,
    a heating means for heating the pumped up bath water,
    a temperature sensing means for controlling said heating means,
    a means for ejecting the filtered and heated water into the bath tub with air bubbles formed by suctioning air, and
    a water purifying means for separating and agglomerating organic substances as well as for sterilizing and deodorizing the bath water and for suppressing the generation of steam, said water purifying means comprising an acid additive prepared by dissolving vermiculite weathered from mica minerals in aqueous inorganic acid solution,
    a means for adding said water purifying means to the bath water,
    said bath water circulating from said bath tub to said ejector nozzle by way of a suction pipe extending into said bath tub.

2. A bath water heater and circulator-purifier apparatus according to claim 1, wherein said apparatus is provided with a selecting means for feeding the pumped up water to said filter means or alternatively directly to said heating means.

3. A bath water heater and circulator-purifier apparatus according to claim 1, wherein said apparatus further comprises an instantaneous water heater comprising a fresh water supply port that can be connected with a water tap, a pipe connected with said supply port, a helical pipe heater provided within said pipe, and a hot water supply port for supplying hot water to the bath tub, said pipe being so designed that it is located within a space formed by installing a partition wall in the space where the helical pipe heater is located.

4. A method or purifying bath water comprising pumping said bath water into a main body of a heater/circulator apparatus so as to filter and heat the bath water, adding an acid additive to said bath water, said additive being effective in separating and agglomerating organic substances as well as in sterilizing and deodorizing the bath water and in suppressing the generation of steam, said additive being prepared by dissolving vermiculite weathered from mica materials in an aqueous acid inorganic solution, ejecting said filtered and heated water with air bubbles from the apparatus into the bath tub by way of an ejector nozzle which is connected with said main body of the heater/circulator apparatus, said air bubbles formed by suctioning ambient air by way of a suction pipe for purifying said bath water by circulating it through said suction pipe, said main body and the ejector nozzle.

* * * * *